United States Patent
Fiedler (10) Patent No.: US 7,457,346 B2
(45) Date of Patent: *Nov. 25, 2008

(54) SPREAD-SPECTRUM SIGNAL GENERATOR

(76) Inventor: Alan Fiedler, 11 Avalon Dr., #13, Marlborough, MA (US) 01752

( * ) Notice: Subject to any disclaimer, the term of this patent is extended or adjusted under 35 U.S.C. 154(b) by 540 days.

This patent is subject to a terminal disclaimer.

(21) Appl. No.: 11/100,198

(22) Filed: Apr. 5, 2005

(65) Prior Publication Data

US 2005/0221785 A1   Oct. 6, 2005

Related U.S. Application Data

(60) Provisional application No. 60/559,567, filed on Apr. 5, 2004.

(51) Int. Cl.
*H04B 1/00* (2006.01)

(52) U.S. Cl. .................. 375/130; 375/135; 375/136; 327/355; 327/357; 327/359; 327/147; 327/156

(58) Field of Classification Search ............... 375/130, 375/135–136, 146–147; 327/147, 156, 315, 327/357, 359

See application file for complete search history.

(56) References Cited

U.S. PATENT DOCUMENTS

| | | | | |
|---|---|---|---|---|
| 5,886,547 A | * | 3/1999 | Durec et al. ............... | 327/113 |
| 6,242,965 B1 | * | 6/2001 | Pickering et al. ............ | 327/359 |
| 6,549,074 B2 | * | 4/2003 | Ugajin et al. ............... | 330/258 |
| 2004/0246047 A1 | * | 12/2004 | Manku et al. ............... | 329/315 |
| 2005/0195032 A1 | * | 9/2005 | Wang et al. ................ | 330/253 |

* cited by examiner

*Primary Examiner*—Shuwang Liu
*Assistant Examiner*—Hirdepal Singh
(74) *Attorney, Agent, or Firm*—Briggs and Morgan, P.A.

(57) ABSTRACT

A spread-spectrum signal generator includes four differential input signal terminals, a differential output signal terminal, four interconnected mixer control subcircuits, a 4-input differential mixer, a first current source having a magnitude which sets the mixer's 3 db bandwidth, and a second current source having a magnitude which controls a frequency difference between the differential output signal the differential input signals. In a preferred embodiment, this frequency difference and the frequency of the differential output signal are modulated through the modulation of the second current source magnitude. The frequency of the modulation is equal to the frequency of the second current source modulation, and the magnitude of the output signal frequency modulation is proportional to the magnitude of the second current source modulation. A desirable result of said output signal frequency modulation is a spreading of the output signal's power over a prescribed band of frequencies and a corresponding reduction in power at any given frequency.

11 Claims, 5 Drawing Sheets

Spread Spectrum Signal Generator

Fig. 1: Spread Spectrum Signal Generator

Fig. 2: Mixer Control Subcircuit

Fig. 3a (nominal I1 and I2 current levels)

Fig. 3b (nominal I1 and elevated I2 current levels)

Fig. 3c (elevated I1 and nominal I2 current levels)

Fig. 4a Triangle-Wave Modulation of I2

Fig. 4b Magnitude vs. Frequency Plot With Triangle-Wave Modulation of I2

| Circuit | Device Name | Device Type | W (um) | L (um) | Gate Connection (if dual-gate) |
|---|---|---|---|---|---|
| Spread Spectrum Signal Generator (Fig. 1) | M1 | P | 16 | 0.25 | INBIASP |
| | M1 | P | 2 | 0.25 | CTRLBIASP |
| | M2 | N | 1 | 0.25 | |
| | M3 | N | 3 | 0.35 | |
| | M4 | P | 4 | 0.25 | |
| | M5 | P | 4 | 0.25 | |
| | M6 | N | 3 | 0.35 | |
| | M7 | P | 4 | 0.25 | |
| | M26 | N | 20 | 2 | |
| Mixer Control Subcircuit (Fig. 2) | M8 | N | 1 | 0.18 | |
| | M9 | P | 2 | 0.25 | |
| | M10-M17 | N | 3 | 0.35 | |
| | P12-P15 | P | 2 | 0.18 | |
| | M18 | P | 8 | 0.18 | |
| | M19, M21 | P | 2 | 0.18 | |
| | M20, M22 | P | 4 | 0.18 | |
| | M23 | P | 1 | 0.18 | |

Fig. 5: Exemplary Device Sizes

SPREAD-SPECTRUM SIGNAL GENERATOR

RELATED APPLICATIONS

This application claims the benefit of U.S. Provisional Application No. 60/559,567, filed Apr. 5, 2004, which application is incorporated by reference herein for all purposes.

BACKGROUND OF THE INVENTION

State-of-the-art circuitry to generate a signal having a spread-spectrum often requires integration with a phase-locked loop device. Typical circuits which can generate a spread-spectrum signal and incorporating a phase-locked loop device require considerable power and circuit area. A need exists for a spread-spectrum signal generator which does not require a phase-locked loop device and is particularly simple, providing for low power, small area, and high performance.

SUMMARY OF THE INVENTION

The function of a spread-spectrum signal generator is to generate an output signal having a modulated frequency such that peaks in the output signal's frequency spectrum (as observed on a spectrum analyzer, for example), are "spread" and their amplitude is reduced. This spreading and amplitude reduction of the peaks is desirable in some electronic systems. The spread-spectrum signal generator described herein generates an output signal having a spread spectrum by mixing in a prescribed manner equal-frequency input signals having distributed phase. In a preferred embodiment, each of the input signals has a frequency, $f_{in}$, and a phase, and theses phases are distributed from 0 to 360 degrees, with the phase of differential input signals INPn, INNn (n=1,2,3,4) nominally equal to 360*((n−1)/4) degrees. In a preferred embodiment of the invention, the spread-spectrum signal generator includes four interconnected mixer control subcircuits, a 4-input differential mixer, a first current source whose magnitude sets the mixer's 3 db bandwidth, and a second current source whose magnitude controls a frequency difference between a differential output signal OUTP, OUTN and the group of differential input signals INPn, INNn (n=1,2,3,4). In a preferred embodiment, this frequency difference (and also, by direct extension, the frequency of the differential output signal) is modulated through the modulation of the second current source magnitude. The frequency of the frequency difference modulation is equal to the frequency of the second current source modulation, and the magnitude of the output signal frequency modulation is proportional to the magnitude of the second current source modulation. The invention uses the mixer to mix input signals having a single frequency and each having a phase, where said phases are distributed from 0 to 360 degrees, and controlling the mixer such that the mixer's output signal frequency is modulated in a prescribed manner.

While the present invention describes the use of a mixer which mixes four differential input signals, those skilled in the art will recognize that the spread-spectrum signal generator can be readily modified such that the number of differential input signals is any number equal to or greater than 3.

BRIEF DESCRIPTION OF THE DRAWINGS

In FIG. 4b, note the narrow peak in the frequency spectrum of INPn, INNn (n=1,2,3,4), and the wider, lower-amplitude peak in the frequency spectrum of OUTP, OUTN.

DETAILED DESCRIPTION OF THE PREFERRED EMBODIMENTS

The invention described herein is a new spread-spectrum signal generator circuit. In an illustrated embodiment of the present invention disclosed hereinafter, the spread-spectrum signal generator circuit includes four interconnected mixer control subcircuits, a 4-input differential mixer, and a first and a second current source.

Figure 1:
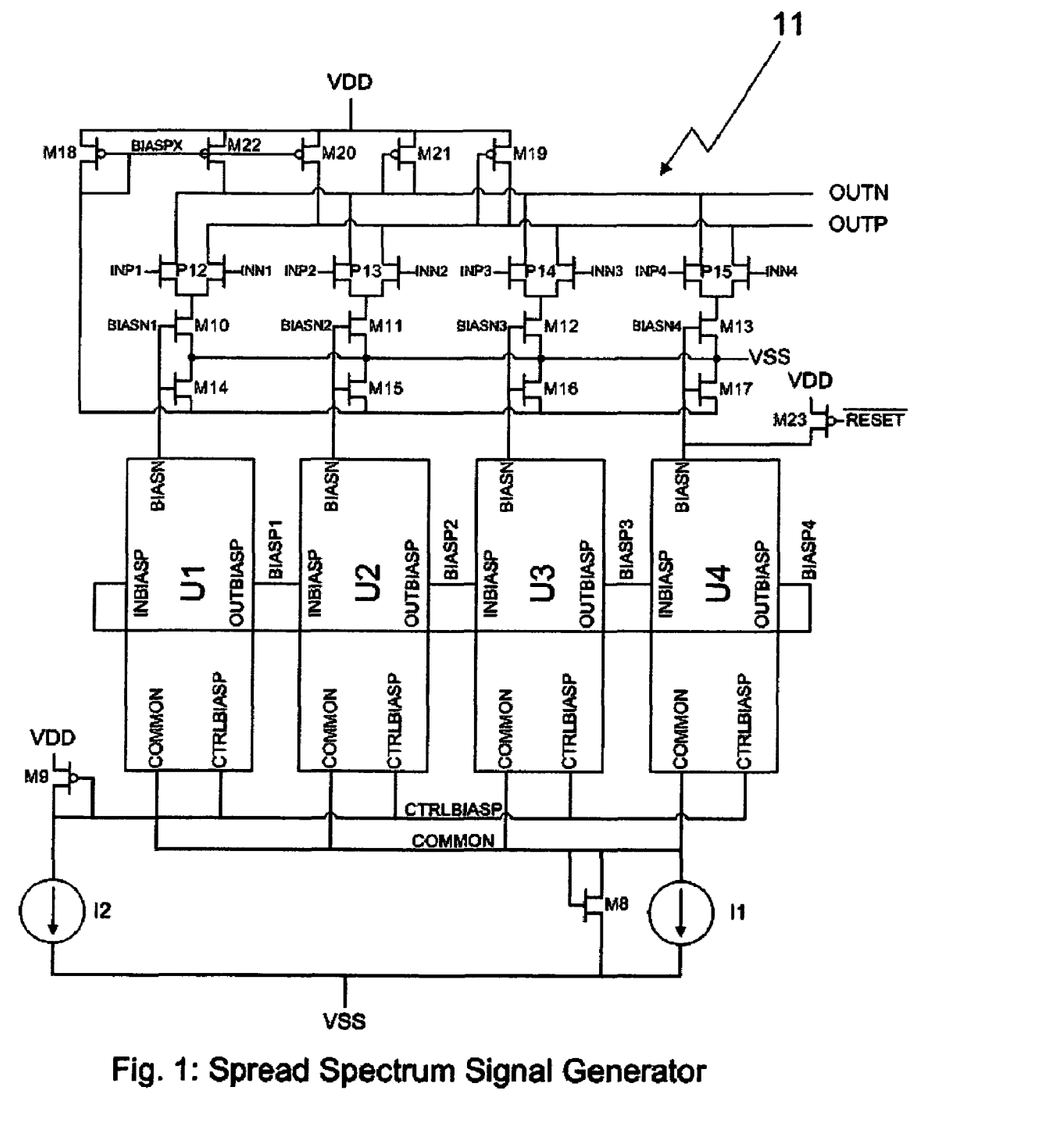
FIG. 1 is a schematic diagram of the spread-spectrum clock generator circuit which includes four interconnected mixer control subcircuits, a 4-input differential mixer, a first current source I1 having a magnitude which sets the 3 db bandwidth of the mixer, and a second current source I2 having a magnitude which controls a frequency difference between the differential output signal OUTP, OUTN and the differential input signals INPn, INNn (n=1,2,3,4).

FIG. 1 illustrates one embodiment of the spread-spectrum clock generator circuit which includes four interconnected mixer control subcircuits U1, U2, U3, and U4, a four-input differential mixer 11, first and second current sources I1 and I2, and diode-connected transistors M8 and M9. The interconnected mixer control subcircuits U1, U2, U3, and U4 are used to generate four mixer control signals BIASN1, BIASN2, BIASN3, and BIASN4. During circuit operation the voltage of the mixer control signals oscillates between 0 and $V_{BIASN,max}$ at a frequency $1/T_{MOD}$, where $V_{BIASN,max}$ is set in part by the magnitude of current source I1, and the frequency $1/T_{MOD}$ is set in part by the magnitude of current source I2. An important characteristic of the behavior of the mixer control signals is that at any given point in time at least one (and at most two) of the four mixer control signals will be at a substantially higher voltage than the other three (or possibly two) mixer control signals. By coupling the mixer control signals to the tail current sources M10, M11, M12, and M13 of the differential mixer 11, differential input signals INPn, INNn (n=1,2,3,4) are selectively mixed onto mixer differential output OUTP, OUTN.

The four mixer control subcircuits U1, U2, U3, and U4 each include analog state output terminals BIASN and OUTBIASP, and analog state control input terminals INBIASP, COMMON, and CTRLBIASP. The BIASN output of U1 is coupled to mixer control signal BIASN1, the BIASN output of U2 is coupled to mixer control signal BIASN2, the BIASN output of U3 is coupled to mixer control signal BIASN3, and the BIASN output of U4 is coupled to mixer control signal BIASN4. To set the sum of the analog voltages of mixer control signals BIASNN (N=1,2,3,4) in proportion to a current, the COMMON terminals of U1, U2, U3, and U4 are each coupled to the COMMON node, to diode-connected transistor M8 and to current source I1. Diode-connected transistor M8 is included in parallel with current source I1 to reduce the loop gain of a feedback circuit which includes transistors M2, M3, M4, and M5 of each mixer control subcircuit. The CTRLBIASP terminals of U1, U2, U3, and U4 are each coupled to the CTRLBIASP node, to diode-connected transistor M9 and to current source I2. In a preferred embodiment, and to provide a means to adjust and control the BIASNn (N=1,2,3,4) signals, the OUTBIASP terminal of U1 is coupled to the INBIASP terminal of U2, the OUTBIASP terminal of U2 is coupled to the INBIASP terminal of U3, the OUTBIASP terminal of U3 is coupled to the INBIASP terminal of U4, and the OUTBIASP terminal of U4 is coupled to the INBIASP terminal of U1. When the phase of differential input signals INPn, INNn (n=1,2,3,4) is nominally equal to 360*((n−1)/4), this preferred embodiment will provide for a "down-spreading" of the output signal such that its frequency is always equal to or less than the input signal frequency, $f_{in}$. Alternatively, if the phase of differential input signals INPn, INNn (n=1,2,3,4) is nominally equal to 360*((4−n)/4), this preferred embodiment will result in an "up-spreading" of the output signal such that its frequency is always equal to or greater than the input signal frequency, $f_{in}$.

Figure 2:
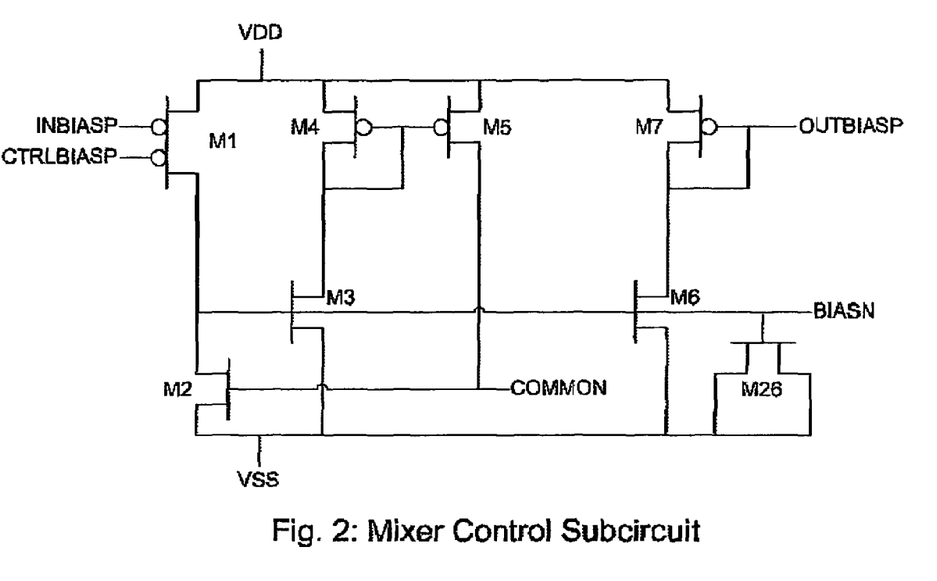
FIG. 2 is a schematic diagram of the mixer control subcircuit.
Figure 3A:
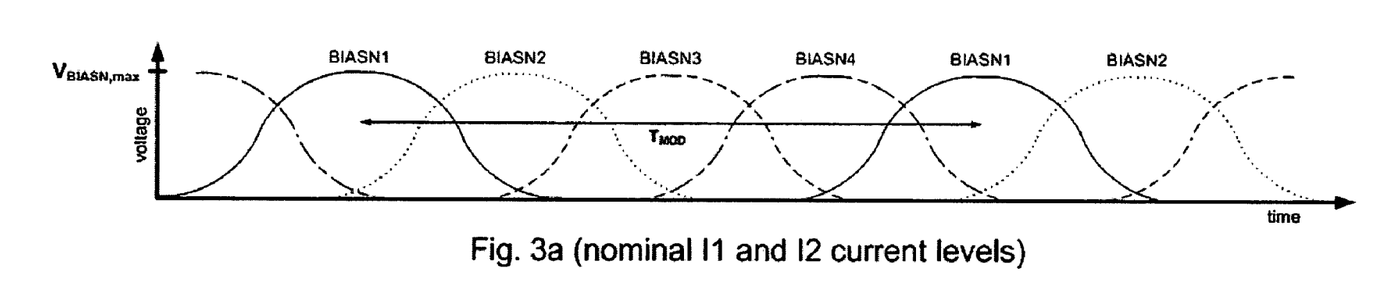
FIG. 3 illustrates electrical behavior of four interconnected mixer control subcircuits.
Figure 3B:
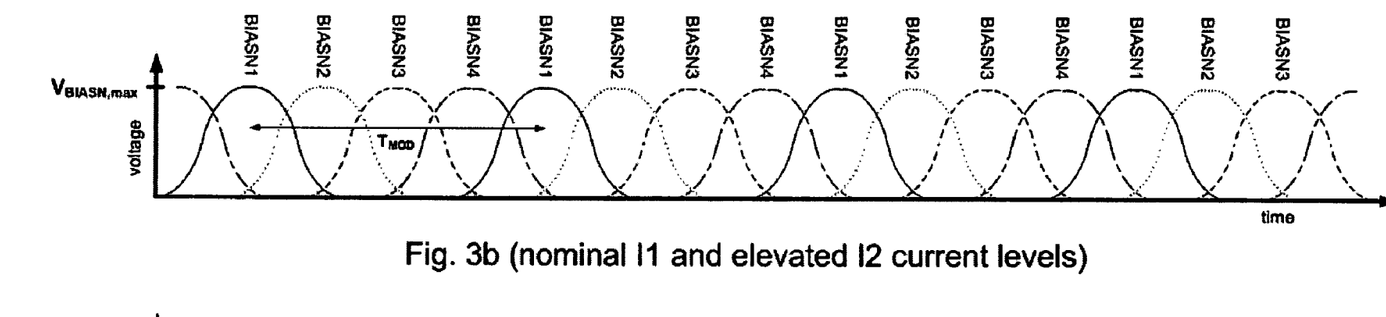
Figure 3C:
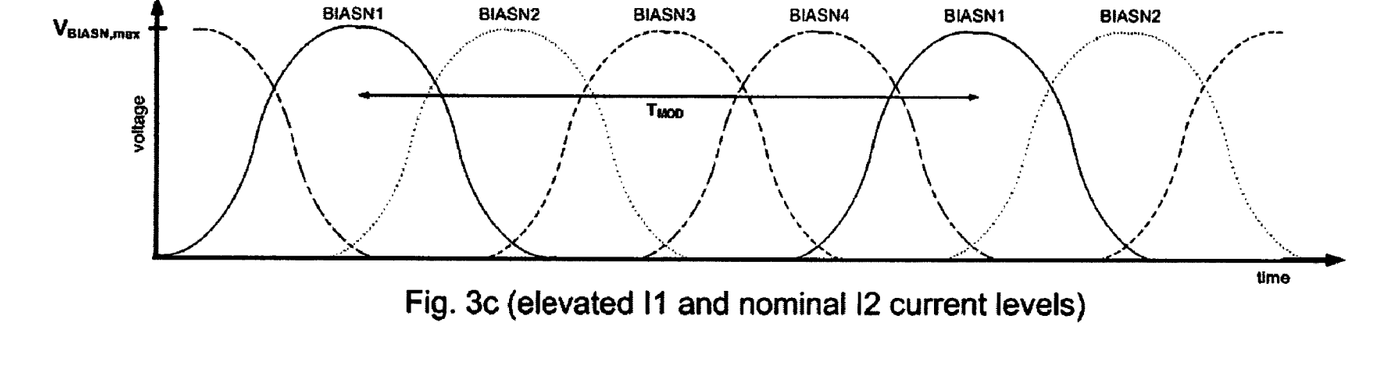
Figure 4A:
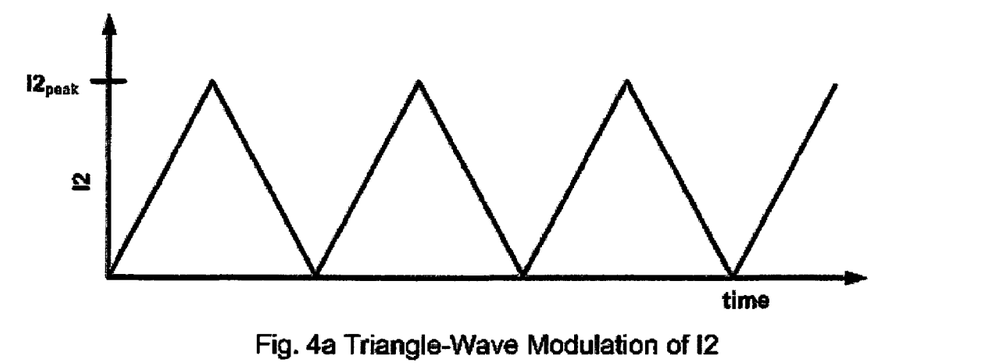
FIG. 4 illustrates waveforms depicting triangle-wave modulation of I2 (FIG. 4a), and a portion of the frequency spectrum of differential input signals INPn, INNn (n=1,2,3,4) and a modulated differential output signal OUTP, OUTN, where said modulation results from a corresponding modulation of the magnitude of the second current source (FIG. 4b).
Figure 4B:
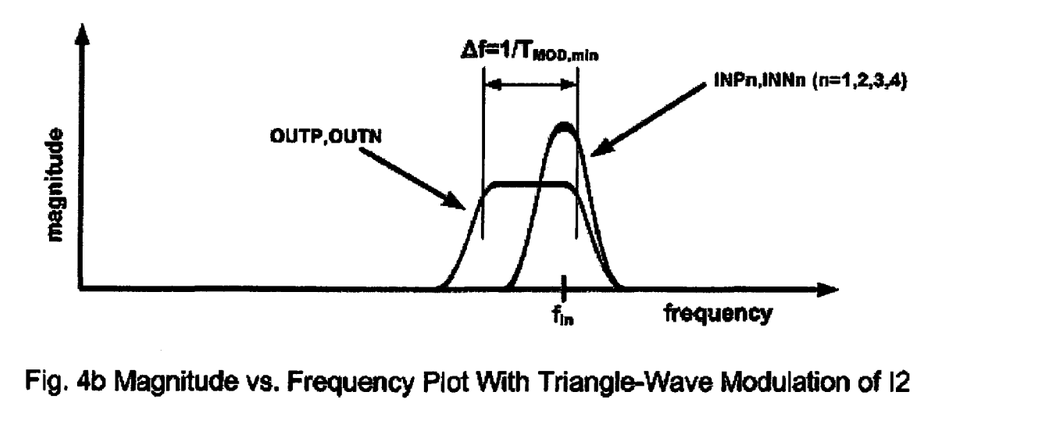

In an alternative embodiment, these connections are reversed, with the OUTBIASP terminal of U1 coupled to the INBIASP terminal of U4, the OUTBIASP terminal of U4 coupled to the INBIASP terminal of U3, the OUTBIASP terminal of U3 coupled to the INBIASP terminal of U2, and the OUTBIASP terminal of U2 coupled to the INBIASP terminal of U1. When the phase of differential input signal INPn, INNn (n=1,2,3,4) is nominally equal to 360*((n−1)/4), this alternative embodiment will result in an "up-spreading" of the output signal such that its frequency is always equal to or greater than the input signal frequency, $f_{in}$. Alternatively, if the phase of differential input signal INPn, INNn (n=1,2,3,4) is nominally equal to 360*((4−n)/4), this alternative embodiment will result in a "down-spreading" of the output signal such that its frequency is always equal to or less than the input signal frequency, $f_{in}$. Differential mixer 11 of FIG. 1 comprises mixer tail current sources M10, M11, M12, and M13; differential pair transistors P12, P13, P14, and P15; mixer load bias transistors M14, M15, M16, M17, and M18; and mixer load transistors M19, M20, M21, and M22. Differential pair transistors P12 are coupled to mixer differential input signal INP1, INN1, to mixer tail current source M14, and to mixer differential output signal OUTP, OUTN. Differential pair transistors P13 are coupled to mixer differential input signal INP2, INN2, to mixer tail current source M15, and to mixer differential output signal OUTP, OUTN. Differential pair transistors P14 are coupled to mixer differential input signal INP3, INN3, to mixer tail current source M16, and to mixer differential output signal OUTP, OUTN. Differential pair transistors P15 are coupled to mixer differential input signal INP4, INN4, to mixer tail current source M17, and to mixer differential output signal OUTP, OUTN. The mixer load bias transistors and mixer load transistors work together to provide a pull-up current, and to balance the average pull-down current induced by the mixer tail current sources, on OUTP and OUTN. To provide for the reset of the interconnected mixer control subcircuits to a known state, the spread-spectrum signal generation circuit of FIG. 1 further includes reset transistor M23 having a gate coupled to /RESET, a drain coupled to BIASN4, and a source coupled to VDD. FIG. 2 illustrates the mixer control subcircuit. Dual-gate transistor M1 sources a current onto BIASN in proportion to the voltages at its gate terminals, coupled to INBIASP and CTRLBIASP. Transistor M2 sinks a current from BIASN in proportion to the voltage at its gate terminal, coupled to COMMON. Transistors M3, M4, and M5 comprise a current source whose current output from the drain of M5 onto COMMON is in proportion to the voltage on BIASN. Transistors M6 and M7 comprise a means to generate a VDD-referenced OUTBIASP voltage from the VSS-referenced BIASN voltage. Transistor M26 controls the frequency response of the interconnected mixer control subcircuits when interconnected as illustrated in FIG. 1. When four mixer control subcircuits are interconnected in the manner illustrated in FIG. 1, a circuit behavior as illustrated in FIGS. 3a-3c is obtained. FIG. 3a shows the phase-shifted rising and falling of BLASNn (n=1,2,3,4) over time. The peak amplitude of BIASNn, $V_{BIASN,max}$ (n=1,2,3,4) impacts the 3 db bandwidth of the mixer, and is also responsive and proportional to the magnitude of current source I1. In a preferred embodiment, the magnitude of current source I1 is set such that the 3 db bandwidth of the mixer is between one and two times the frequency of differential input signals INPn, INNn (n=1,2,3,4). The peak magnitude of I2, $I2_{PEAK}$ (of FIG. 4a), determines the maximum frequency of BIASNn (N=1,2,3,4), $f_{BIASNn,max}=1/T_{MOD,min}$, and this quantity is also equal to the induced frequency spectrum spread Δf in differential output signal OUTP, OUTN (FIG. 4b). The ability to modulate the time between successive peaks of BIASNn by modulating I2, as well as the magnitude of the peaks, is key to the generation of a spread-spectrum differential output signal at OUTP, OUTN having a wide range of center frequencies, $f_{in}$, and spread magnitudes, Δf.

When the BIASNn (n=1,2,3,4) signals are used to control the 4-input mixer 11 as illustrated in FIG. 1, and current source I2 is time-modulated in the shape of a triangle (FIG. 4a), the frequency spectrum of the mixer's output signal, relative to its input signals, is controlled so as to produce an output signal with a spread frequency content, as illustrated in FIG. 4b.

Figure 5:
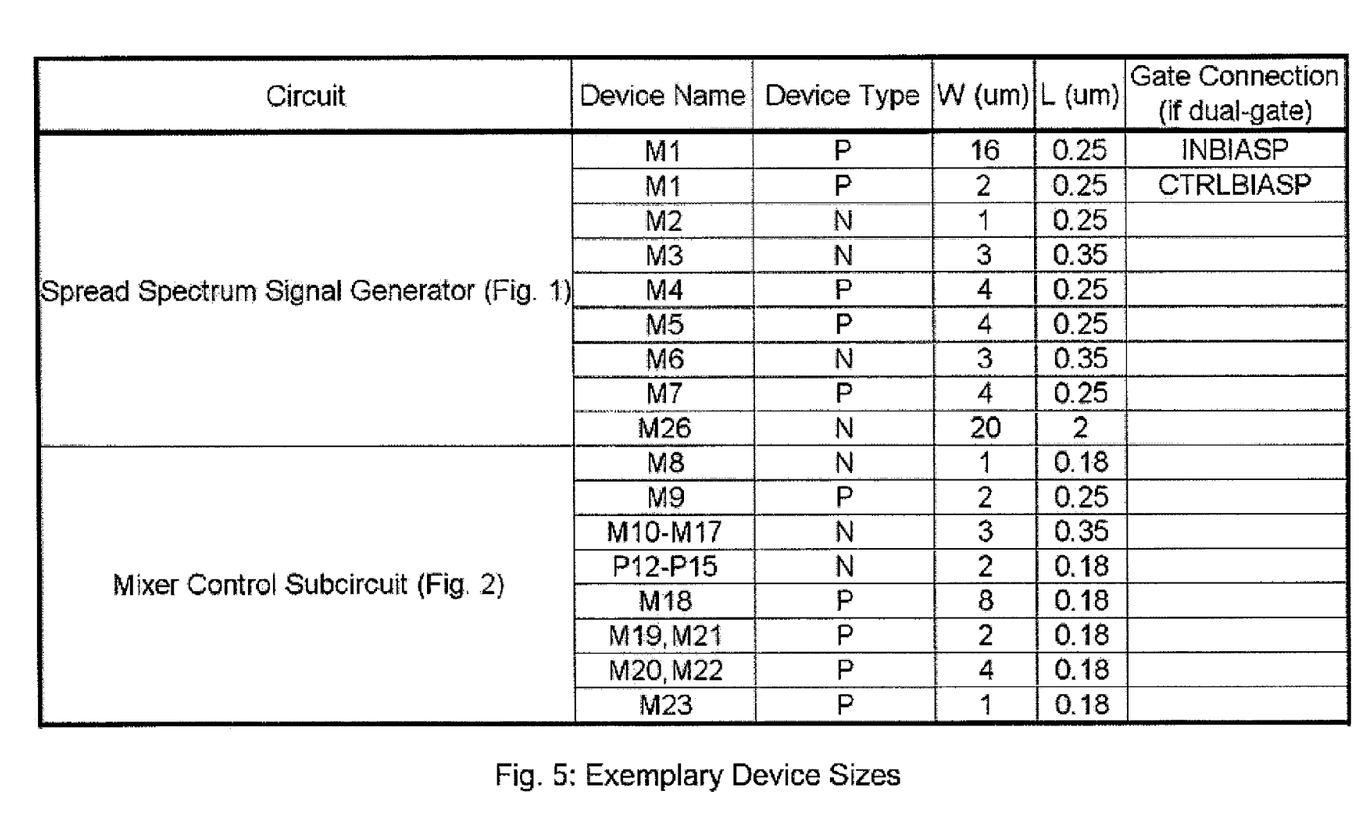
FIG. 5 lists suggested device sizes for each transistor in the circuit. These device sizes are strictly exemplary, as many other device sizes and combinations of device sizes will also be found to be acceptable.

FIG. 5 lists suggested device sizes for each transistor in the circuit. These device sizes are strictly exemplary, as many other device sizes and combinations of device sizes will also be found to be acceptable.

The claims herein describe a spread-spectrum signal generator comprising four interconnected mixer control subcircuits coupled to a 4-input mixer. In certain applications, it can be desirable to mix more than four input signals. Those skilled in the art will recognize that a mixer used to mix more than four input signals can be controlled through the use of additional interconnected mixer control subcircuits.

The claims also describe differential input signals having equal frequency, and phases distributed between 0 and 360 degrees. Those skilled in the art will be familiar with methods to generate these input signals, including, but not limited to, methods which use a delay-locked loop or a phase-locked loop.

The claims further describe a first current source. The magnitude of the current generated by the first current source in a preferred embodiment has been described as being between one and two times the frequency of differential input signals INPn,INNn (n=1,2,3,4). Those skilled in the art will recognize how to use a delay-locked loop or phase-locked loop to generate a current to meet this recommendation.

Gate connections to any of the dual-gate transistors in the figures may be reversed with no loss in functionality, though minor changes in circuit behavior may result.

Except to the extent specified in the following claims, the circuit configurations and device sizes shown herein are provided as examples only. Those skilled in the art will recognize that desired and proper circuit operation can be achieved with differential or single-ended circuit configurations, for example, and with different device sizes, and/or combinations of device sizes.

The spread-spectrum signal generator can be implemented with discreet components, with semiconductor devices embedded in an integrated circuit such as an application specific integrated circuit (ASIC), or with a combination of both. Individual signals or devices can be active high or low, and corresponding circuitry can be converted or complemented to suit any particular convention. The term "coupled" used in the claims includes various types of connections or couplings and includes a direct connection or a connection through one or more intermediate components.

What is claimed is:

1. A mixer control subcircuit, comprising:
   first and second power supply terminals;
   a CTRLBIASP analog state control terminal;
   an INBIASP analog state control terminal;
   a COMMON terminal;
   BIASN and OUTBIASP state output terminals;
   a dual-gate transistor having a drain coupled to the BIASN terminal, a first gate coupled to the INBIASP terminal, a second gate coupled to the CTRLBIASP terminal, and a source coupled to the second power supply terminal;
   a second transistor having a drain coupled to the BIASN terminal, a gate coupled to the COMMON terminal, and a source coupled to the first power supply terminal;
   a third transistor having a drain, a gate coupled to the BIASN terminal, and a source coupled to the first power supply terminal;
   a fourth transistor having a gate and a drain coupled to the drain of the third transistor, and a source coupled to the second power supply terminal;
   a fifth transistor having a drain coupled to the COMMON terminal, a gate coupled to the gate of the fourth transistor, and a source coupled to the second power supply terminal;
   a sixth transistor having a drain coupled to the OUTBIASP terminal, a gate coupled to the BIASN terminal, and a source coupled to the first power supply terminal; and
   a seventh transistor having a drain and a gate coupled to the OUTBIASP terminal, and a source coupled to the second power supply terminal.

2. A mixer control circuit, comprising:
   first, second, third, and fourth BIASN mixer control nodes;
   and a plurality of mixer control subcircuits of claim 1 including first, second, third, and fourth mixer control subcircuits, wherein:
      the first mixer control subcircuit's OUTBIASP terminal is coupled to the second mixer control subcircuit's INBIASP terminal;
      the second mixer control subcircuit's OUTBIASP terminal is coupled to the third mixer control subcircuit's INBIASP terminal;
      the third mixer control subcircuit's OUTBIASP terminal is coupled to the fourth mixer control subcircuit's INBIASP terminal;
      the fourth mixer control subcircuit's OUTBIASP terminal is coupled to the first mixer control subcircuit's INBIASP terminal;
      the first mixer control subcircuit's BIASN terminal is coupled to the first BIASN mixer control node;
      the second mixer control subcircuit's BIASN terminal is coupled to the second BIASN mixer control node;
      the third mixer control subcircuit's BIASN terminal is coupled to the third BIASN mixer control node;
      the fourth mixer control subcircuit's BIASN terminal is coupled to the fourth BIASN mixer control node;
      the first power supply terminals of the first, second, third, and fourth mixer control subcircuits are coupled together;
      the second power supply terminals of the first, second, third, and fourth mixer control subcircuits are coupled together;
      the COMMON terminals of the first, second, third, and fourth mixer control subcircuits are coupled together; and
      the CTRLBIASP terminals of the first, second, third, and fourth mixer control subcircuits are coupled together.

3. The mixer control circuit of claim 2, further comprising:
   a first current source coupled between the COMMON terminals and the first power supply terminals;
   an eighth transistor having a drain and a gate coupled to the COMMON terminals, and a source coupled to the first power supply terminals;
   a second current source coupled between the CTRLBIASP terminals and the first power supply terminals; and
   a ninth transistor having a gate and a drain coupled to the CTRLBIASP terminals and a source coupled to the second power supply terminals.

4. A mixer comprising:
   the mixer control circuit of claim 3;
   first, second, third, and fourth differential input terminals;
   a mixer differential output terminal comprising a positive output terminal and a negative output terminal;
   a BIASPX node;
   a first pair of transistors having a first and a second drain, a pair of gates coupled to the first differential input terminals, and a first and second source coupled together;
   a second pair of transistors having a first and a second drain, a pair of gates coupled to the second differential input terminals, and a first and second source coupled together;
   a third pair of transistors having a first and a second drain, a pair of gates coupled to the third differential input terminals, and a first and second source coupled together;
   a fourth pair of transistors having a first and a second drain, a pair of gates coupled to the fourth differential input terminals, and a first and second source coupled together;
   a tenth transistor having a drain coupled to the first and second source of the first pair of transistors, a gate coupled to the first BIASN mixer control node, and a source coupled to the first power supply terminals;
   an eleventh transistor having a drain coupled to the first and second source of the second pair of transistors, a gate coupled to the second BIASN mixer control node, and a source coupled to the first power supply terminals;
   a twelfth transistor having a drain coupled to the first and second source of the third pair of transistors, a gate coupled to the third BIASN mixer control node, and a source coupled to the first power supply terminals;
   a thirteenth transistor having a drain coupled to the first and second source of the fourth pair of transistors, a gate coupled to the fourth BIASN mixer control node, and a source coupled to the first power supply terminals;
   a fourteenth transistor having a drain coupled to the BIASPX node, a gate coupled to the first BIASN mixer control node, and a source coupled to the first power supply terminals;
   a fifteenth transistor having a drain coupled to the BIASPX node, a gate coupled to the second BIASN mixer control node, and a source coupled to the first power supply terminals;

a sixteenth transistor having a drain coupled to the BIASPX node, a gate coupled to the third BIASN mixer control node, and a source coupled to the first power supply terminals;

a seventeenth transistor having a drain coupled to the BIASPX node, a gate coupled to the fourth BIASN mixer control node, and a source coupled to the first power supply terminals;

an eighteenth transistor having a gate and drain coupled to the BIASPX node, and a source coupled to the second power supply terminals;

a nineteenth transistor having a gate and a drain coupled to the positive output terminal, and a source coupled to the second power supply terminals;

a twentieth transistor having a drain coupled to the positive output terminal, a gate coupled to the BIASPX node, and a source coupled to the second power supply terminals;

a twenty-first transistor having a gate and a drain coupled to the negative output terminal, and a source coupled to the second power supply terminals; and a twenty-second transistor having a drain coupled to the negative output terminal, a gate coupled to the BIASPX node, and a source coupled to the second power supply terminals.

5. The mixer of claim 4, further comprising:
a first differential input signal coupled to the first differential input terminal;
a second differential input signal coupled to the second differential input terminal;
a third differential input signal coupled to the third differential input terminal; and
a fourth differential input signal coupled to the fourth differential input terminal.

6. The mixer of claim 5, wherein:
the first differential input signal has a first input phase;
the second differential input signal has a second input phase;
the third differential input signal has a third input phase;
the fourth differential input signal has a fourth input phase;
the magnitude of the first, second, third, and fourth input phases are distributed between 0 and 360 degrees;
the second input phase is greater than the first input phase;
the third input phase is greater than the second input phase;
the fourth input phase is greater than the third input phase;
the first, second, third, and fourth input signals have an input frequency; and
the mixer differential output terminal exhibits a differential output signal having an output phase, as measured relative to one of the differential input signals, and an output frequency.

7. The mixer of claim 6, wherein a current generated by the first current source has a variable magnitude, and the variable magnitude is proportional to the input frequency.

8. The mixer of claim 6, wherein:
the current generated by the second current source has a magnitude; and
the output phase changes over time, and a rate of output phase change is proportional to the magnitude of the second current source.

9. The mixer of claim 7, further comprising:
a twenty-third transistor having a drain coupled to a BIASN mixer control node, a gate coupled to a /RESET input terminal, and a source coupled to the second power supply terminal.

10. The mixer control subcircuit of claim 9, wherein the dual-gate transistor further comprises:
a twenty-fourth transistor having a drain coupled to the BIASN node, a gate coupled to the CTRLBIASP terminal, and a source; and
a twenty-fifth transistor having a drain coupled to the source of the twenty-fourth transistor, a gate coupled to the INBIASP terminal, and a source coupled to the second power supply terminals.

11. The mixer control subcircuit of claim 10, further comprising:
a twenty-sixth transistor having a gate coupled to the BIASN node, and a source and a drain coupled to the first power supply terminals, for the purpose of controlling circuit frequency response.

* * * * *

UNITED STATES PATENT AND TRADEMARK OFFICE
CERTIFICATE OF CORRECTION

| | | |
|---|---|---|
| PATENT NO. | : 7,457,346 B2 | Page 1 of 1 |
| APPLICATION NO. | : 11/100198 | |
| DATED | : November 25, 2008 | |
| INVENTOR(S) | : Alan Fiedler | |

It is certified that error appears in the above-identified patent and that said Letters Patent is hereby corrected as shown below:

Col. 8, claim 9, line 1, delete "7" and insert --8-- therefor.

Signed and Sealed this

Twenty-first Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,457,346 B2 | Page 1 of 1 |
| APPLICATION NO. | : 11/100198 | |
| DATED | : November 25, 2008 | |
| INVENTOR(S) | : Alan Fiedler | |

It is certified that error appears in the above-identified patent and that said Letters Patent is hereby corrected as shown below:

Col. 8, claim 9, line 13, delete "7" and insert --8-- therefor.

This certificate supersedes the Certificate of Correction issued April 21, 2009.

Signed and Sealed this

Twelfth Day of May, 2009

JOHN DOLL
*Acting Director of the United States Patent and Trademark Office*